(12) United States Patent
Schmidt et al.

(10) Patent No.: US 12,331,903 B2
(45) Date of Patent: Jun. 17, 2025

(54) METHOD FOR OPERATING A TAILLIGHT OF A MOTOR VEHICLE, AND MOTOR VEHICLE

(71) Applicant: AUDI AG, Ingolstadt (DE)

(72) Inventors: Valentin Schmidt, Neuburg a.d. Donau (DE); Daniel Halbig, Riedenburg (DE); Ernst Reiter, Ingolstadt (DE); Roman Horst, Ingolstadt (DE); Viktor Hahn, Ingolstadt (DE)

(73) Assignee: AUDI AG, Ingolstadt (DE)

( * ) Notice: Subject to any disclaimer, the term of this patent is extended or adjusted under 35 U.S.C. 154(b) by 0 days.

(21) Appl. No.: 18/040,603

(22) PCT Filed: Jun. 17, 2021

(86) PCT No.: PCT/EP2021/066342
§ 371 (c)(1),
(2) Date: Aug. 28, 2023

(87) PCT Pub. No.: WO2022/028760
PCT Pub. Date: Feb. 10, 2022

(65) Prior Publication Data
US 2024/0278712 A1    Aug. 22, 2024

(30) Foreign Application Priority Data

Aug. 5, 2020    (DE) ............... 10 2020 120 596.1

(51) Int. Cl.
*F21S 43/145* (2018.01)
*B60Q 1/00* (2006.01)
(Continued)

(52) U.S. Cl.
CPC .......... *F21S 43/145* (2018.01); *B60Q 1/0023* (2013.01); *B60Q 1/30* (2013.01);
(Continued)

(58) Field of Classification Search
CPC ......... F21S 43/14; B60Q 1/30; B60Q 1/0023; B60Q 1/535
See application file for complete search history.

(56) References Cited

U.S. PATENT DOCUMENTS 5,828,319 A    10/1998  Tonkin et al.
8,400,286 B2 *  3/2013  Pusch ................ B60Q 1/535
                                         362/543

(Continued)

FOREIGN PATENT DOCUMENTS

DE    000069327472 T2    8/2000
DE    102004002334 A1    8/2005
(Continued)

OTHER PUBLICATIONS

International Search Report and Written Opinion of the International Searching Authority directed to related International Patent Application No. PCT/EP2021/066342, mailed Oct. 7, 2021, with attached English-language translation; 20 pages.

(Continued)

*Primary Examiner* — Matthew J. Peerce
(74) *Attorney, Agent, or Firm* — Sterne, Kessler, Goldstein & Fox P.L.L.C.

(57) ABSTRACT

A method for operating a taillight of a motor vehicle, wherein the taillight, in particular in addition to a functional light source assigned to at least one further light function, has a taillight source assigned to a taillight function, having a plurality of lighting regions that can be controlled independently with respect to operation and brightness, wherein at least one environment sensor of the motor vehicle records sensor data describing other traffic participants behind within a predefined distance range from the rear of the motor vehicle, wherein if at least one activation criterion evaluating the sensor data and checking for the presence of at least one further traffic participant within a predetermined dis- (Continued)

tance range from the rear of the motor vehicle, a brightness-increasing switching operation, in particular an activation and/or a dimming, of a second lighting region of the taillight source which was previously inactive or is operating with lower brightness than at least one other, first lighting region is carried out in such a way that the emitted total brightness of a portion of the taillight comprising at least the taillight source remains constant.

18 Claims, 3 Drawing Sheets

(51) Int. Cl.
  *B60Q 1/30* (2006.01)
  *B60Q 1/50* (2006.01)
  *F21S 43/14* (2018.01)
(52) U.S. Cl.
  CPC .............. *B60Q 1/535* (2022.05); *F21S 43/14* (2018.01); *B60Q 2400/20* (2013.01)

(56) References Cited

U.S. PATENT DOCUMENTS

| | | | |
|---|---|---|---|
| 9,777,518 B2 * | 10/2017 | Warschat | .............. G01S 17/931 |
| 2006/0164222 A1 | 7/2006 | Nou | |
| 2017/0330464 A1 * | 11/2017 | Yoo | ........................... B60T 7/22 |
| 2019/0051184 A1 * | 2/2019 | Lahav | ................... G01S 13/931 |
| 2019/0193626 A1 * | 6/2019 | Park | .................... B60W 40/105 |

FOREIGN PATENT DOCUMENTS

| | | |
|---|---|---|
| DE | 202008017397 U1 | 11/2009 |
| DE | 202010013761 U1 | 12/2010 |
| DE | 102009043953 A1 | 3/2011 |
| DE | 102012024666 A1 | 6/2014 |
| DE | 102014005423 A1 | 9/2014 |
| DE | 102014017354 A1 | 5/2016 |
| DE | 102016110013 A1 | 12/2016 |
| DE | 102016224147 A1 | 6/2018 |
| EP | 3093192 A1 | 11/2016 |
| EP | 3190005 A1 | 7/2017 |
| EP | 3514012 A1 | 7/2019 |
| WO | WO 2004005962 A1 | 1/2004 |

OTHER PUBLICATIONS

International Preliminary Report on Patentability directed to related International Patent Application No. PCT/EP2021/066342, completed Feb. 23, 2022, with attached English-language translation; 13 pages.

* cited by examiner

METHOD FOR OPERATING A TAILLIGHT OF A MOTOR VEHICLE, AND MOTOR VEHICLE

TECHNICAL FIELD

The present disclosure relates to a method for operating a taillight of a motor vehicle, wherein the taillight, in particular in addition to a functional light source assigned to at least one further light function, has a taillight source assigned to a taillight function with a plurality of lighting regions which can be actuated independently with respect to the operation and the brightness. In addition, the present disclosure relates to a motor vehicle.

BACKGROUND

Motor vehicles usually have a plurality of external lights which are at least partially designed for better visibility of the motor vehicle by day and/or at night, for the purpose of improving the sight of an occupant and/or for signaling to other traffic participants. With regard to these external lights, it is also known, in particular, to provide combined or integrated external lights for a plurality of light functions. For example, in addition to the integration of a daytime running light and/or a direction indicator in a front headlight, it is also known to provide taillights which, in addition to a taillight function, can also provide a braking light function and/or a driving direction indicator function and/or further lighting functions. In this case, external lights on motor vehicles are designed in particular such that the applicable local or country-specific legal requirements for light intensity, attachment height, switching logic and further parameters, which can be referred to collectively as lighting val-ues, are complied with.

The development consisting of integrating several lighting functions in a single external light is further promoted by new light technologies that use light-emitting diodes (LEDs), organic light-emitting diodes (OLEDs) and/or lasers. In particular, by using organic light-emitting diodes, an attractive outer design can be combined with variable usability. For example, it is known to use so-called segmented OLEDs, in which a plurality of independently controllable segments of a lighting area of a corresponding light source of the external light are provided. In particular, it is also possible to dim the individual segments independently, which means that the brightness of the individual segments is regulated by corresponding control, which can be effected, for example, by pulse-width modulation. Besides OLEDs, so-called LED matrices are also known, which are formed from a plurality of LEDs arranged in a matrix-like manner. In this case, lighting regions which are formed by individual LEDs and/or by a plurality of LEDs can be defined, for example.

In the case of taillights as external lights of such type, a control device is usually provided, for example a control device which controls the light sources or lighting regions of the taillights, for example when braking takes place, a brake light source and/or, when a corresponding lever has been actuated in the motor vehicle, a direction indicator light source (direction indicator or "turn signal"). The activation state of a taillight and thus of the associated taillight function usually results from an overall external light function, for example the activation of low beam, position light or the like. In this case, it has already been proposed in the prior art to automatically select different operating modes of a lighting system of the motor vehicle, which can also include the taillights, as a function of the ambient brightness. For example, an automatic light system can switch to low beam/position light when the ambient brightness decreases, wherein the operation of direction indicators and brake light remains unchanged. In particular, the light functions in known motor vehicles usually have constant brightness (intensity), so that the visual comfort of other traffic participants is not taken into account.

DE 10-2016-224 147 A1 relates to a system for distance- and speed-sensitive control of the brightness of a light emitted by a taillight of an ego vehicle. In this document it is proposed to significantly improve safety in road traffic by an automated control of the light intensity of at least one taillight of an ego vehicle on the basis of a reaction to (interaction with) conditions in the environment of the ego vehicle. The presence of another traffic participant can be detected by a suitable sensor system. In particular, glare can be effectively counteracted.

DE 10-2012-024 666 A1 relates to a method and a device for controlling a light distribution of a light of a vehicle. In this case it is proposed that the output light distribution of a light is changed when a quality of measurement signals indicating the weather conditions in the surroundings of the vehicle is below a threshold value. The light may be a taillight. Since many accidents in poor visibility conditions are triggered by vehicles driving ahead being scarcely visible, it is particularly advantageous to control the taillight in order to provide improved visibility of the vehicle.

DE 10-2004-002 334 A1 discloses a control circuit for the lighting system of a motor vehicle, wherein, in order to prevent traffic participants behind from being annoyed by the light of the taillight, the rear light can be controlled by a dimmer as a function of an ambient brightness decreasing over time. A slow lighting-up of the rear light is thus carried out, which cannot be confused with the brake light lighting up at once at full intensity.

Nevertheless, there are driving situations in which it would be desirable to ensure an improved recognition of the ego motor vehicle by other traffic participants, in particular in order to signal to other traffic participants the presence of the ego motor vehicle. This is not possible with previously known approaches for controlling taillights.

BRIEF DESCRIPTION OF DRAWINGS

The accompanying drawings, which are incorporated herein and form a part of the specification, illustrate the embodiments of the present disclosure, and together with the description, further serve to explain the principles of the embodiments and enable a per-son skilled in the pertinent art to make and use the embodiments, individually, or as a combination thereof.

In the drawings, like reference numbers generally indicate identical or similar elements. Additionally, generally, the

DETAILED DESCRIPTION

Figure 1:
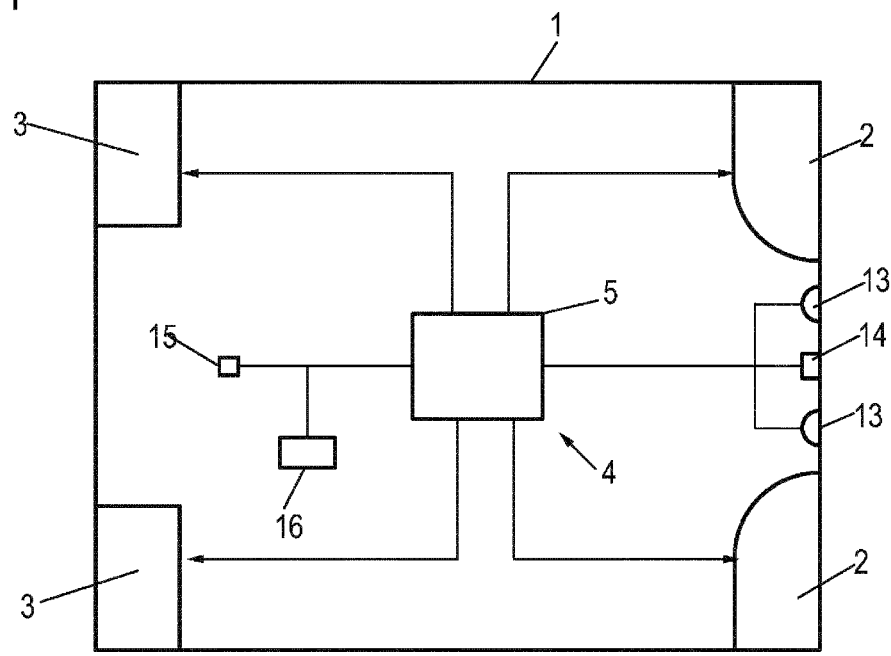
FIG. 1 depicts a schematic diagram of a motor vehicle, according to some embodiments.

The present disclosure is therefore based on the object of specifying a mode of operating taillights which enables improved awareness of the ego motor vehicle by other traffic participants.

In order to achieve this object, according to the present disclosure, a method of the type mentioned is provided, characterized in that further sensor data describing traffic participants following in the rear space behind the motor vehicle are recorded by at least one environment sensor of the motor vehicle, wherein a brightness-increasing switching operation, in particular an activation and/or a dimming of a second lighting region of the tail light source, which was previously inactive or operating at a reduced brightness in relation to another first lighting region, is carried out when at least one activation criterion is fulfilled, which evaluates the sensor data and checks for the presence of at least one further traffic participant within a predefined distance range to the rear of the motor vehicle, in such a way that the emitted total brightness of a portion of the taillight comprising at least the taillight source remains constant.

It is therefore proposed, for improved awareness of other traffic participants when such a traffic participant who is following the ego motor vehicle (who therefore has the same direction of travel) is entering a predefined distance range in the rear space behind the motor vehicle or is detected there, to activate a previously inactive lighting region of the taillight source or to increase the brightness of a previously only extremely dark lighting region, wherein the activation of previously unused lighting regions is preferred. However, the overall brightness of at least a portion of the taillight is kept constant, for example by reducing the brightness for another lighting region of the taillight source, but in particular by performing the compensation via at least one further functional light source of the taillight, which will be discussed in more detail below. Since many motor vehicles usually have two taillights, the method is obviously expediently preferably used for both taillights.

Such a switching operation can be referred to as an adaptive surface variation and is aimed at switching on or dimming-up taillight components in the case of a traffic participant detected behind, so that a dynamic emerges which leads to improved awareness of the traffic participant. In this case, it can be provided, in particular, that in the case of the activation criterion not being met occurring after the activation criterion was met, there is a switch back into the previous operating state, in particular into a normal operating state.

The taillight is, as already indicated, preferably a taillight integrating several light functions, wherein the at least one further light function is selected particularly advantageously from the group comprising a brake light function and/or a direction indication function. A structural unit can thus be provided comprising the taillight, which, in addition to the taillight function, also provides at least one driving direction indicator function and/or a brake light function.

In a first, alternative embodiment of the present disclosure, it can be provided that the portion only comprises the taillight source, wherein for compensating for the increase in brightness of the at least one second lighting region, the brightness of at least one first lighting region is reduced. In this case, it is conceivable in particular for the brightness of all the first lighting regions to be lowered uniformly to compensate for the increase in brightness of the at least one second lighting region. In an advantageous embodiment, it can be provided that the increase in brightness with respect to the at least one second lighting region is implemented up to a target brightness which is less than the previous brightness of the first lighting regions, wherein for compensation the brightness of all the first lighting regions is reduced uniformly, in particular such that the first lighting regions are still lit up more brightly than the at least one second lighting region.

This embodiment is based on the fact that, in the present disclosure, the primary objective is a sensitization of other traffic participants to the ego motor vehicle, for which purpose it is already sufficient to activate a second previously inactive lighting region with a rather low brightness level, since in this way a dynamic is produced which directs the gaze of a driver of the other traffic participant or of the other traffic participant as such onto the motor vehicle according to the embodiment. In this case, it is conceivable, for example, for the target brightness to be a maximum of 10% of the previous brightness of the first lighting regions.

It is also conceivable within the scope of the present disclosure that the at least one first lighting region and the at least one second lighting region have the same total area, wherein their brightnesses are swapped round for the switching operation, in particular in a periodically repeated switching operation. If, for example, first lighting regions are operating with 100% brightness but before the first switching operation the second lighting regions were only at half the brightness, in particular at 50%, and the total areas of the lighting regions are however identical, the total brightness of the taillight source can also be kept constant by the brightnesses simply being swapped round, for example in a periodic sequence of 50:100, 100:50, 50:100, etc. In principle, it is also conceivable to switch off the second light sources and to switch on the first light sources in order to realize the switching operation, but this is less preferred since it would possibly result in an excessively strong effect.

It should be pointed out for this first alternative of the embodiment that such a function can also advantageously be combined with a dimming function of the further light function. According to the present disclosure, it can be provided that, in addition to the generated dynamics in the taillight source, an adaptive intensity variation in the taillight source takes place in which, when a dimming condition is satisfied which also evaluates the sensor data and which can correspond to the activation criterion, the brightness of the function light source assigned to at least one further light function is reduced compared to a normal operating mode (in other words, in particular a normal brightness), hence in particular the braking light function and/or the driving direction indicator function being dimmed down. In this way the braking light intensity and/or driving direction indicator intensity can be reduced when a traffic participant is detected behind, in particular in order to prevent or at least reduce a potential dazzling of this other traffic participant. The reduced intensity of the brake light and/or of the direction indicator light when detecting someone behind thus contributes to visual comfort. At the same time, however, traffic behind can be made aware of the ego motor vehicle thanks to the switching operation. In this way, a reduced awareness of the ego motor vehicle, possibly due to the increase in visual comfort, can thus be compensated synergetically or can even be overcompensated by the switching operation, in particular by activating previously inactive second lighting regions.

Within the scope of the present disclosure, it is also possible, in general, for all lighting regions of the taillight source to be operated with an identical brightness, which ensures a harmonious appearance of the taillight, which is not impaired by other light functions, once the at least one previously inactive/dark second lighting region has been activated/dimmed-up.

In an alternative, second embodiment of the present disclosure, it can be provided that the portion beside the taillight source comprises at least one of the at least one functional light sources. In this case, even when the activation of the function light source is carried out only during the switching operation, as will be explained in more detail, the total intensity is kept at the normal brightness value at which the function light source would operate were the activation criterion not met.

Specifically, it can be provided that the increase in brightness is compensated by the switching operation exclusively by a reduction in brightness of the function light source. This has the massive advantage that the combination of measures mentioned with respect to the first variant of the embodiment—dimming the further light function, dynamics in the taillight function—can expediently be combined in such a way that nothing changes in the overall brightness impression. However, since the brightness is distributed in a wider manner overall, dazzling effects are significantly reduced and visual comfort is increased, while the observer also becomes more aware of the ego motor vehicle. For example, in the case of the active braking light, it can be provided that, when another traffic participant behind enters the predefined distance range, a previously inactive second lighting region is switched on, in particular to the same brightness with which the first lighting regions of the taillight are already being operated, wherein the brightness of the brake light source is reduced by the brightness which is correspondingly added to the taillight. Overall, it can also be conceivable that after the activation, all the first and second lighting regions are operated with the same brightness, wherein, after in particular the braking light function and the direction indicator function have received an indication and warning signal, it is expediently ensured that the brightness of these lighting functions remains greater than the brightness of the taillight function. However, this is usually possible without any problem since the direction indicators and/or brake lights are operated at a significantly higher brightness than taillights anyway, so that a second lighting region of the taillight, which is in particular activated at a lower brightness level, can be selected without any problem.

In an expedient development of the present disclosure, it can be provided that the activation criterion is evaluated as fulfilled only when additional operation of the at least one further light function of the taillight is detected. This means that the sensitization can be limited to cases in which the ego motor vehicle would particularly advantageously want to output an indication and/or a warning via the further light function. In this case, the effect of the light function is emphasized and expediently supplemented by the sensitization by means of the dynamic given by the increase In brightness of the second lighting segment, so that safety can be increased again significantly in this regard.

Within the scope of the present disclosure, the activation criterion can also take into account further boundary conditions which are to be present in order to carry out sensitization to the ego motor vehicle. This means that, according to a development of the embodiment, it can be provided that at least one additional condition related to the ego motor vehicle and/or the traffic participants and/or environmental conditions is additionally checked by the activation criterion. Specifically, it can be provided in this context that the at least one additional condition checks,
whether the relative speed of the traffic participant relative to the ego motor vehicle lies within a first speed interval, and/or
whether the speed of the ego motor vehicle lies within a second speed interval, and/or
whether a tailgate of the motor vehicle is closed and/or
whether the ambient brightness lies within an ambient brightness interval.

The use of the method according to the embodiment is particularly expedient in regions of low speed and/or low relative speed relative to the traffic participant behind. Low absolute speeds indicate that there is a more complex traffic situation in which it may be more relevant to sensitize to the ego motor vehicle, in particular when the ego motor vehicle outputs relevant signals via a further light function. If there is only a low relative speed, it can be assumed that the traffic participant behind will remain in the region of the rear space behind the motor vehicle for a longer time, which in particular is also more difficult for the driver of the ego motor vehicle to notice. In this case too, sensitization is particularly expedient. For example, it can be checked whether the relative speed and/or the speed of the ego motor vehicle lie below a speed threshold value, so that the particular speed interval can range from zero to the particular speed threshold value, for example, in order to detect lower speeds.

The ambient brightness can also be expediently considered in the context of the present disclosure in order to assess the general visibility of the ego motor vehicle via the taillight and to take it into consideration accordingly. If, for example, it is already very dark, it can be assumed that other traffic participants are already sufficiently aware of the ego motor vehicle.

For this purpose, other conceivable additional conditions or boundary conditions apply, for example also basic boundary conditions such as a check as to whether the ignition is active, the tailgate is closed and the like. In this regard, the activation criterion can ultimately be supplemented and expanded as desired.

In an expedient development of the present disclosure, it can further be provided that the switching operation of the at least one second lighting region takes place with an increased, prespecified target brightness, and/or which is determined as a function of a distance from the traffic participant determined from the sensor data and/or with a dimming rate which is determined as a function of a distance from the traffic participant determined from the sensor data. In the context of the present disclosure, it is therefore also possible to coordinate the proposed sensitization process with the specific actual traffic situation, for example by taking into account a distance from the traffic participant behind, which can be determined from the sensor data, and to select a target brightness as a function of this distance. At the same time or alternatively, it is also possible to influence the dimming speed, and thus to influence how abruptly the activation or generally the brightness-increasing switching operation is to take place. In this case, the target brightness and/or the dimming speed need not necessarily be selected as a function of the current traffic situation, in particular as described by the sensor data, but it is also conceivable to make these parameterizable, for example selectable by the user and/or a manufacturer. In addition to variables related to traffic participants behind, the target brightness and/or the dimming speed can also be adaptable depending on further operating variables of the motor vehicle and/or traffic situation variables, for example an ambient brightness.

Expediently, the first and second lighting regions can be implemented by segments of at least one segmented OLED. Segmented OLEDs represent a simple way of defining larger partial areas of a lighting area of a light source, in this case in particular the taillight source, which can be controlled and also dimmed independently of one another. In principle, it is of course also conceivable to use other variants, for example LED matrices, wherein the first and second lighting regions can be formed, for example, by individual LEDs and/or groups of LEDs of the LED matrix.

A radar sensor and/or a lidar sensor and/or a camera and/or an ultrasonic sensor can expediently be used as the environment sensor. In this case, it is particularly advantageous to use ultrasonic sensors arranged in the rear region of the motor vehicle, for example also assigned to a parking assistance system, which can in particular have a specific detection range which can also correspond to the upper limit of the prespecified distance range, so that in exemplary embodiments the sheer fact of another traffic participant being detected by the ultrasonic sensors can already be sufficient to ensure the association with the predefined distance range. A plurality of sensor types can also be used together, wherein use can be made of sensor data fusion. Radar sensors and/or lidar sensors are useful in particular when accurate information about the traffic participant behind is intended to be determined or used.

In addition to the method, the present disclosure also relates to a motor vehicle having a taillight which, in particular in addition to a functional light source assigned to at least one further light function, has a taillight source assigned to a taillight function, having a plurality of lighting regions which can be actuated independently with respect to operation and brightness, an ambient sensor which is directed toward the rear space behind the motor vehicle and a control device designed for actuating the taillight. The motor vehicle is characterized in that the controller is designed to carry out the method according to the embodiment. All embodiments relating to the method according to the present disclosure can be analogously transferred to the motor vehicle according to the embodiment so that the advantages already mentioned can also be achieved with this motor vehicle. The controller can comprise in particular at least one control device of the motor vehicle.

Figure 2:
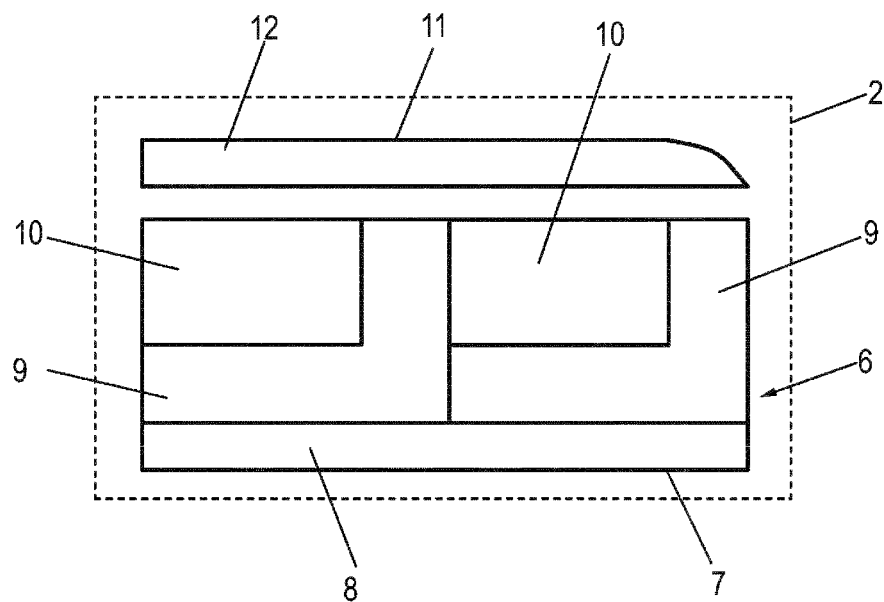
FIG. 2 depicts a taillight of the motor vehicle according to some embodiments.
Figure 3:
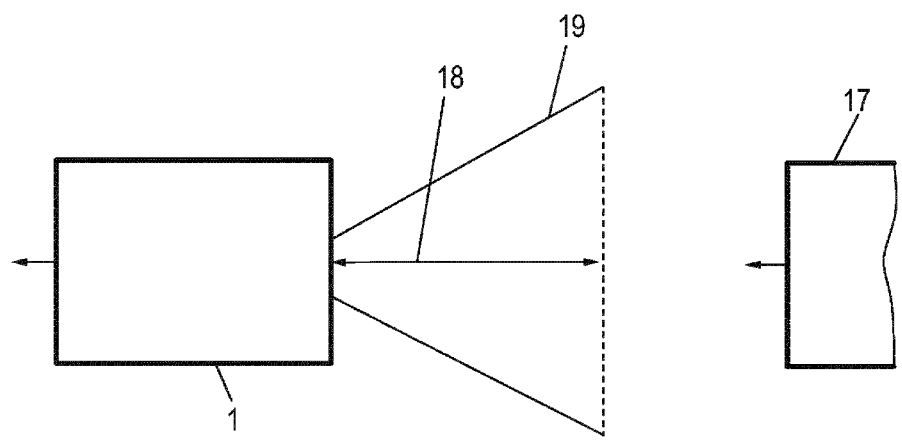
FIG. 3 depicts the motor vehicle in a first traffic situation; according to some embodiments.
Figure 4:
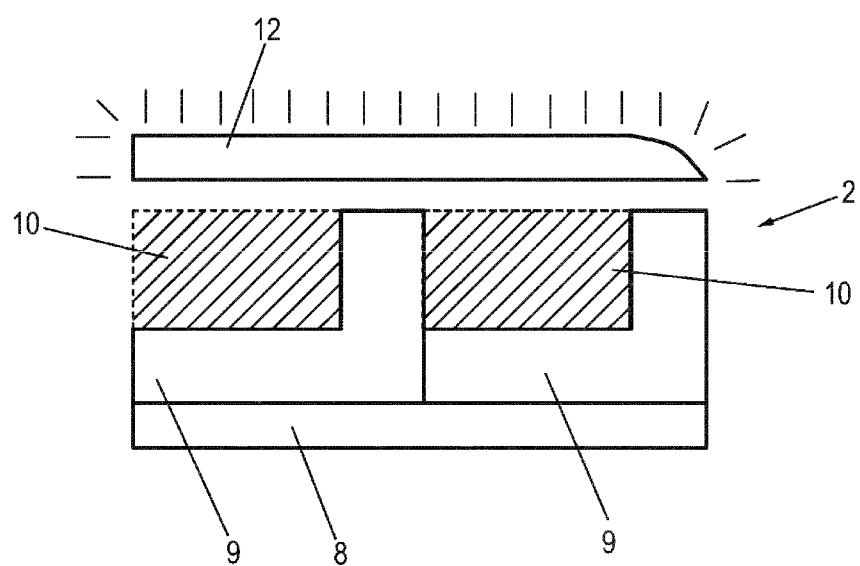
FIG. 4 depicts the operation of the taillight in the first traffic situation, according to some embodiments.
Figure 5:
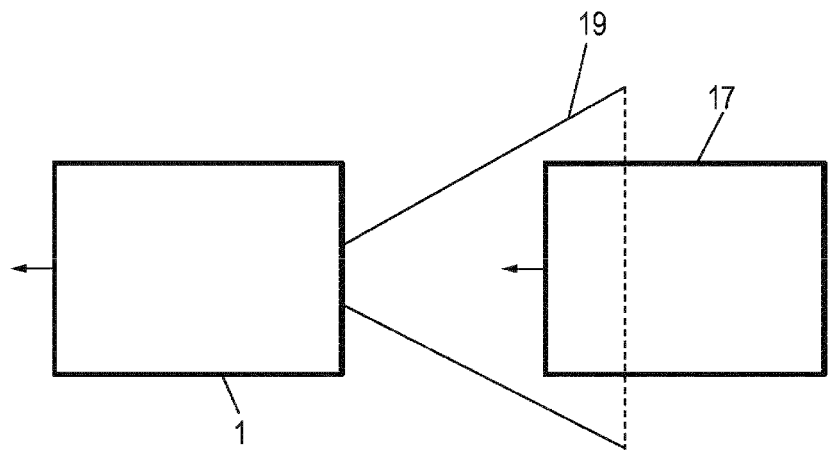
FIG. 5 depicts the motor vehicle in a second traffic situation, according to some embodiments.
Figure 6:
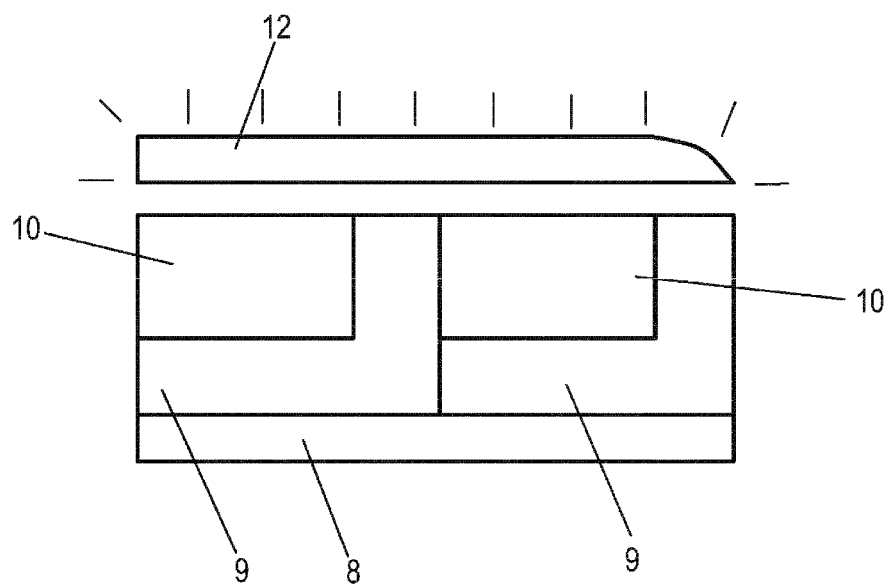
FIG. 6 depicts the operation of the taillight in the second traffic situation, according to some embodiments.

Further advantages and details of the present disclosure arise from the exemplary embodiments described below and in reference to the drawings. The following is shown:

FIG. 1 is a schematic diagram of a motor vehicle according to an embodiment;

FIG. 2 is a taillight of the motor vehicle according to an embodiment,

FIG. 3 is the motor vehicle in a first traffic situation according to an embodiment;

FIG. 4 is the operation of the taillight in the first traffic situation according to an embodiment;

FIG. 5 is the motor vehicle in a second traffic situation according to an embodiment, and FIG. 6 is the operation of the taillight in the second traffic situation according to an embodiment.

FIG. 1 shows a schematic diagram of a motor vehicle 1 according to the embodiment. This motor vehicle has a lighting device which comprises a plurality of external lights, in the present case in particular two taillights 2, which are arranged at the rear of the motor vehicle 1, essentially opposite the headlights 3. The operation of the lighting device is controlled by means of a controller 4, which in the present case comprises a control device 5. Further external lights, not shown in greater detail here, can also be provided.

FIG. 2 shows the structure of a taillight 2 in more detail. The taillight 2 serves here to implement two different light functions, namely a taillight function and a brake light function. Taillights 2 are also conceivable which implement further light functions, for example in addition a driving direction indicator function and/or a reversing light function.

In the present exemplary embodiment, the taillight 2 has a taillight source 6 for implementing the taillight function, which is formed in the present case by a segmented OLED 7, the segments of which form different lighting regions 8, 9 and 10. The segments and thus also the lighting regions 8, 9, 10 are independently controllable and, in particular, their brightness can also be controlled independently.

In order to implement the brake light function, the taillight 2 also has a braking light source 11 as a function light source assigned as a further light function as the brake light function, which in the present case has only a single lighting region 12. Of course, it is also possible in principle with respect to the braking light source 11 to implement it with a plurality of lighting regions 12. The brake light source 11 can be implemented by one or more LEDs, one or more OLEDs or by a conventional light source. It should also be noted that the taillight source 6 can, for example, also be implemented by an LED matrix with its lighting regions 8, 9, 10, but the segmented OLED 7 is preferred.

To return to FIG. 1, the controller 4 is configured to carry out a method according to the embodiment. In particular, the controller 4 thus checks an activation criterion which at least checks whether another traffic participant with the same direction of travel is located within a predefined distance range from the rear of the motor vehicle 1 by evaluating sensor data of various environment sensors 13, 14 directed toward the rear space behind the motor vehicle 1. Further additional conditions and/or boundary conditions can also be checked, for which reason the controller 4 can also be connected to further sensors and/or vehicle systems, in the present case at least to a light sensor 15 and to a vehicle system 16 which supplies information regarding the current speed of the motor vehicle 1. Additional conditions can check, for example, whether the relative speed of the other traffic participant (if detected) lies within a first speed relative to the ego motor vehicle, whether the speed of the ego motor vehicle lies within a second speed interval, whether a tailgate of the motor vehicle is closed, whether the ignition is switched on and/or whether the ambient brightness measured by the light sensor 15 lies within an ambient brightness interval. Internal light control processes can also be evaluated by the activation criterion, which will be discussed in more detail.

In the exemplary embodiment shown, the environment sensors 13 can, for example, be ultrasonic sensors, the environment sensor 14, for example, can be a radar sensor or a lidar sensor. In this case, the distance range can be selected such that it corresponds to the detection range of the environment sensors 13 designed as ultrasonic sensors, so that when these detect an object when the motor vehicle 1 is in operation, it can always be assumed that there is a traffic participant behind. Radar sensors and/or lidar sensors can provide more accurate information in this regard, for example the distance to the other traffic participant behind and/or its speed/relative speed. Cameras can also be used as environment sensors 13, 14.

If the activation criterion is fulfilled and all lighting regions 8, 9, 10 were not already being operated at maximum brightness for other reasons, the controller 4 will increase the brightness of at least a second one of the lighting regions 8, 9, 10, which region was previously darker than the other first lighting regions 8, 9, 10, whether by activating it, which is preferred when this lighting region was previously inactive, or by dimming up. However, this takes place such that, for at least a portion of the taillight 2, which comprises at least the taillight source 6, the total brightness (total intensity) remains unchanged.

In this context, it should also be noted that the type of brightness increase (and also for keeping the same overall brightness the type of decrease in brightness of other lighting regions) can be parameterizable. Exemplary embodiments are thus conceivable in which the target brightness aimed at by the increase in brightness is selected as a function of at least one variable describing the traffic situation, for example as a function of a distance from the traffic participant as determined from the sensor data. The same is also possible with respect to the dimming speed of the brightness-increasing switching operation (and possibly of the brightness-reducing switching processes taking place in parallel).

Due to the brightness-increasing switching operation, which is carried out when the activation criterion is met, the other traffic participant will be sensitized with respect to the ego motor vehicle 1. In a specific, expedient embodiment, this can be done in a context-bound manner, in which the activation criterion additionally checks whether the brake light function (and/or optionally a further light function integrated in the taillight 2) is in operation, so that the indicating and/or warning functionality thereof is supported.

FIGS. 3 to 6 explain the procedure more precisely on the basis of traffic situations. FIG. 3 shows a first traffic situation in which anther traffic participant 17 is following the motor vehicle 1 at a great distance. In other words, the traffic participant 17 is located outside a distance range 18 in the rear space behind the motor vehicle 1, which can be defined, for example, by the detection range 19 of the environment sensors 13, in particular ultrasonic sensors. FIG. 4 shows the corresponding appearance of the taillight 2 (normal operating state). For the taillight, the first lighting regions 8, 9 are activated, while the second lighting regions 10 are switched off, which can ensure, for example, a characteristic appearance. The lighting region 12 of the braking light source 11 is lit undimmed and has a normal brightness.

In the second traffic situation according to FIG. 5, which can follow the first traffic situation according to FIG. 3, for example, in which the traffic participant 17 is getting closer, the traffic participant 17 is detected within the distance range 18, specifically In the detection region 19. The corresponding portion of the activation criterion is therefore fulfilled. When the appearance of the taillight 2 shown in FIG. 6 is considered, it will be assumed that the activation criterion is fulfilled overall, and additional conditions related to the speeds are fulfilled, for example, and the braking light function is active. Accordingly, the lighting regions 10 in the brightness-increasing switching operation have now also been activated in addition to the first lighting regions 8, 9. This means that in the present case all lighting regions 8, 9, 10 of the taillight source 6 are being operated. During a braking process of the motor vehicle 1, the brake light source, specifically the lighting region 12, also lights up, but less than the normal brightness of FIG. 4.

In two embodiments are conceivable in order to arrive at the result of FIG. 6, in which the first lighting regions 8, 9 and the second lighting regions 10 of the taillight source 6 are all being operated with the same brightness. Alternatively, the second lighting regions 10 can also be activated with significantly lower brightness than the first lighting regions 8, 9.

In a first variant of the present disclosure, the part whose overall brightness is to remain unchanged can correspond to the taillight source 6. This means that the increase in brightness of the second lighting regions 10 is compensated by a decrease in brightness of the first lighting regions 8, 9, in the present case by way of example such that all lighting regions 8, 9, 10 are lit equally brightly. Irrespective of this, the brightness of the lighting region 12 is reduced, for example due to the fulfillment of a dimming criterion, in order to increase the visual comfort of the traffic participant behind 17 as much as possible. The brightness reduced in relation to the normal brightness of the braking light source 11 is preferably even overcompensated by the sensitizing effect of activating the second lighting regions 10.

In a second variant of the present disclosure, the portion whose overall brightness is to remain equal comprises both the taillight source 6 and the braking light source 11, thus all lighting regions 8, 9, 10, 12. In the present case, the procedure is specifically such that only the lighting region 12 is dimmed in order to compensate for the activation of the second lighting regions 10, but in such a way that the braking light source 11 is still brighter than the taillight source 6 operating with uniform brightness.

The invention claimed is:

1. A method for operating a taillight of a motor vehicle, wherein the taillight comprises a first light source and a second light source each of which can be independently controlled by a controller, the method comprising:
   parameterizing a first target light intensity and/or a first dimming speed of the first light source and a second target light intensity and/or a second dimming speed of the second light source during a repeating oscillation of a light intensity of the first light source and a light intensity of the second light source;
   capturing, using a distance sensor, a distance from the motor vehicle to a traffic participant behind the motor vehicle;
   determining that the distance lies within a predefined distance threshold; and
   based on the determining that the distance lies within the predefined distance threshold, initiating the repeating oscillation of the light intensity of the first light source and the light intensity of the second light source, wherein:
     the first light source is inactive prior to the initiating, and
     a luminous flux of the taillight remains constant during the repeating oscillation,
     wherein the initiating the repeating oscillation comprises:
       gradually brightening the first light source by a light intensity value; and
       gradually dimming the second light source by the light intensity value.

2. The method according to claim 1, wherein the taillight further comprises a third light source assigned to a brake light function or a driving direction indicator function.

3. The method according to claim 1, wherein an area of the first light source and an area of the second light source are equal.

4. The method according to claim 2, further comprising:
   determining that the third light source is active; and
   initiating the oscillation based on the determining that the third light source is active.

5. The method according to claim 1, wherein the initiating is further based on whether:
- a speed of the motor vehicle lies within a speed interval for the motor vehicle,
- a tailgate of the motor vehicle is closed, or
- an ambient brightness lies within an ambient brightness interval.

6. The method according to claim 1, wherein the initiating is further based on whether a relative speed of the traffic participant in relation to the motor vehicle lies within a first speed interval.

7. The method according to claim 1, wherein the light intensity value is pre-specified or dependent on the distance from the motor vehicle to the traffic participant.

8. The method according to claim 1, wherein the first light source and the second light source are segmented organic light-emitting diodes.

9. The method according to claim 1, wherein the distance sensor is a radar sensor, a lidar sensor, a camera, or an ultrasonic sensor.

10. A motor vehicle, comprising:
- a taillight comprising a first light source and a second light source;
- a distance sensor directed toward a rear space behind the motor vehicle; and
- a controller configured to independently control the first light source and the second light source, wherein the controller is further configured to:
  - parameterize a first target light intensity and/or a first dimming speed of the first light source and a second target light intensity and/or a second dimming speed of the second light source during a repeating oscillation of a light intensity of the first light source and a light intensity of the second light source;
  - capture a distance from the motor vehicle to a traffic participant behind the motor vehicle;
  - determine that the distance lies within a predefined distance threshold; and
  - initiate, based on a determination that the distance lies within the predefined distance threshold, the repeating oscillation of the light intensity of the first light source and the light intensity of the second light source, wherein:
    - the first light source is inactive prior to initiating the repeating oscillation, and
    - a luminous flux of the taillight remains constant during the repeating oscillation,
  - wherein the controller is further configured to initiate the repeating oscillation by:
    - gradually brightening the first light source by a light intensity value; and
    - gradually dimming the second light source by the light intensity value.

11. The motor vehicle according to claim 10, wherein the taillight further comprises a third light source assigned to a brake light function or a driving direction indicator function.

12. The method according to claim 2, further comprising: reducing the light intensity of the third light source in response to the initiating so the emitted light intensity of the taillight remains within a light intensity threshold.

13. The motor vehicle according to claim 10, wherein an area of the first light source and an area of the second light source are equal.

14. The motor vehicle according to claim 11, wherein the controller is further configured to:
- determine that the third light source is active; and
- initiate the oscillation based on a determination that the third light source is active.

15. The motor vehicle according to claim 10, wherein the controller is further configured to initiate based on whether:
- a speed of the motor vehicle lies within a speed interval for the motor vehicle,
- a tailgate of the motor vehicle is closed, or
- an ambient brightness lies within an ambient brightness interval.

16. The motor vehicle according to claim 10, wherein the is further based on whether a relative speed of the traffic participant in relation to the motor vehicle lies within a first speed interval.

17. The method according to claim 1, wherein the target light intensity of the second light source is less than the target light intensity of the first light source.

18. The method according to claim 17, wherein the target light intensity of the second light source is a maximum of 10% of the target light intensity of the first light source.

* * * * *